United States Patent
Wang et al.

(10) Patent No.: US 10,614,546 B2
(45) Date of Patent: Apr. 7, 2020

(54) GRAPHICS PROCESSING

(71) Applicant: Arm Limited, Cambridge (GB)

(72) Inventors: Jian Wang, Lund (SE); Henrik Nils-Sture Olsson, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/290,709

(22) Filed: Mar. 1, 2019

(65) Prior Publication Data

US 2019/0287207 A1 Sep. 19, 2019

(30) Foreign Application Priority Data

Mar. 15, 2018 (GB) .................................. 1804167.3

(51) Int. Cl.
*G06T 1/20* (2006.01)
*G09G 5/36* (2006.01)

(52) U.S. Cl.
CPC ............... *G06T 1/20* (2013.01); *G09G 5/363* (2013.01)

(58) Field of Classification Search
CPC ......... G06T 15/005; G06T 1/20; G06T 15/04; G06T 15/40; G09G 5/363; G09G 5/393; G09G 2360/122; H03M 7/6029
See application file for complete search history.

(56) References Cited

U.S. PATENT DOCUMENTS

| | | | | |
|---|---|---|---|---|
| 10,311,016 | B2* | 6/2019 | Heggelund | G06F 15/7882 |
| 2013/0141445 | A1* | 6/2013 | Engh-halstvedt | G06T 5/002 |
| | | | | 345/506 |
| 2015/0301584 | A1 | 10/2015 | Sideris | |
| 2015/0301826 | A1 | 10/2015 | Sideris | |
| 2015/0301827 | A1 | 10/2015 | Sideris | |
| 2017/0316601 | A1* | 11/2017 | Kakarlapudi | G09G 5/373 |
| 2019/0287207 | A1* | 9/2019 | Wang | G09G 5/363 |

FOREIGN PATENT DOCUMENTS

GB 2514655 12/2014

OTHER PUBLICATIONS

GB Combined Search and Examination Report dated Sep. 17, 2018, GB Patent Application No. GB1804167.3.

* cited by examiner

*Primary Examiner* — Todd Buttram
(74) *Attorney, Agent, or Firm* — Vierra Magen Marcus LLP

(57) ABSTRACT

When processing graphics fragments within a processing stage of a graphics processing pipeline, wherein the graphics fragments each represent a set of one or more sampling points to be processed, comparing sampling points with each other at an input of the processing stage to determine whether multiple of the sampling points would give the same processing result when processed by the processing stage so that a first one of the sampling points can be processed and the processing result for that sampling point can then be duplicated at the output for other processing results determined to give the same processing result.

21 Claims, 8 Drawing Sheets

GRAPHICS PROCESSING

BACKGROUND

The technology described herein relates to methods and systems for processing graphics data, i.e. for graphics processing.

Graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively. These processes form part of the graphics processing pipeline.

The rasterising process determines the sample positions that should be used for a primitive (i.e. the (x, y) positions of the sampling points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sampling points (i.e. "shades" each sampling point). This can involve applying textures, blending sampling point data values, etc.

In graphics literature, the term "rasterisation" is sometimes used to mean both primitive conversion to sample positions and rendering. However, herein "rasterisation" will be used to refer to converting primitive data to sampling point addresses only.

These processes are typically carried out by testing sets of one, or of more than one, sampling point, and then generating for each set of sampling points found to include a sampling point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

A "fragment" is therefore effectively (has associated with it) a set of primitive data as interpolated to a given output space sampling point or points of a primitive. It may also include per-primitive and other state data that is required to shade the primitive at the sampling point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

The fragments are processed at various processing stages within the graphics processing pipeline. In general, it is desired that the fragments are processed efficiently. In this context, the Applicants believe that there remains scope for improved arrangements for processing graphics fragments within a processing stage of a graphics processing pipeline.

BRIEF DESCRIPTION OF THE DRAWINGS

Various embodiments of the technology described herein will now be described by way of example only and with reference to the accompanying drawings, in which.

DETAILED DESCRIPTION

Figure 1:
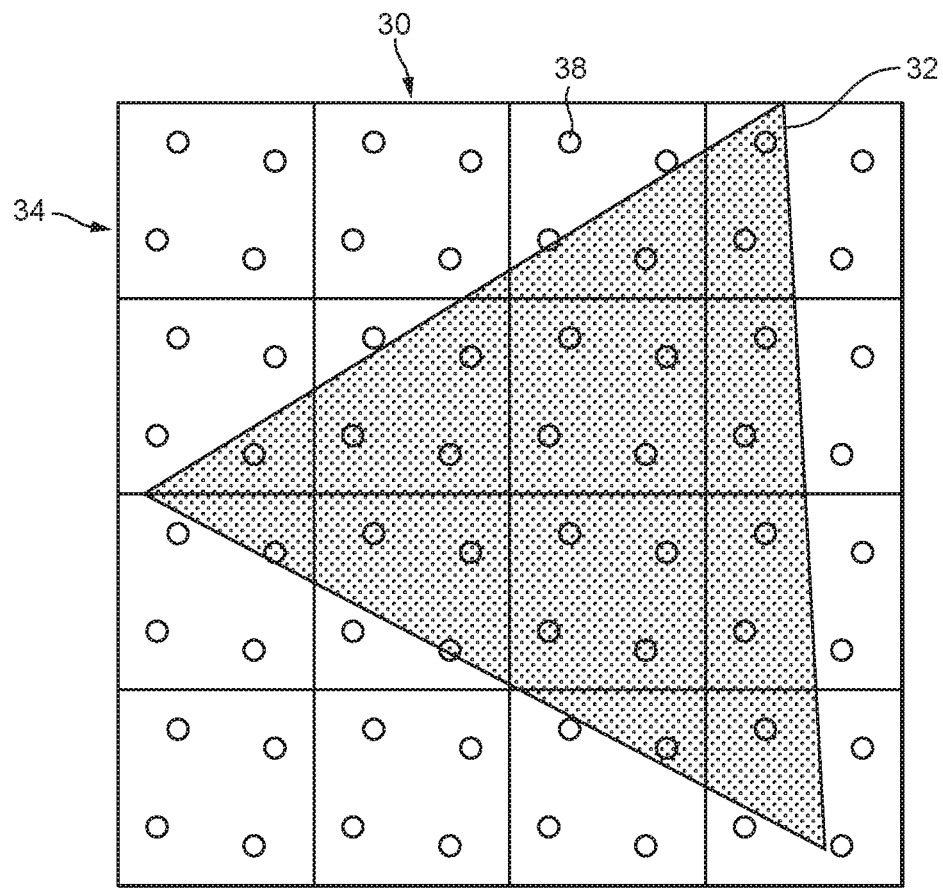
FIG. 1 shows schematically an image to be displayed.

A first embodiment of the technology described herein comprises a method of processing graphics fragments within a processing stage of a graphics processing pipeline, wherein the graphics fragments each represent a set of one or more sampling points to be processed, the method comprising:

providing a pool of sampling points to be processed, wherein the number of sampling points within the pool of sampling points is greater than the number of sampling points that can be processed by the processing stage in a single cycle;

comparing sampling points within the pool of sampling of points with each other to determine whether multiple of the sampling points would give the same processing result when processed by the processing stage;

when it is determined that multiple of the sampling points would give the same processing result, processing a first one of those sampling points and generating location information for the other(s) of the multiple sampling points that were determined to give the same processing result, wherein the location information contains information indicative of the respective location of the other(s) of the multiple sampling points to allow the other(s) of the multiple sampling points to subsequently be written out for their respective locations; and writing out the processing result for each of the multiple sampling points by duplicating the result of the processing of the first sampling point and writing out the duplicated result for the respective location(s) for each of the other(s) of the multiple sampling points that were determined to give the same processing result based on the associated location information.

Thus, according to embodiments of the technology described herein, a pool of sampling points is provided, wherein the number of sampling points to be processed within the pool of sampling points is greater than the number of sampling points that can be processed by the processing stage in a single cycle. In this way, the Applicants have found that it is possible to improve the processing performance (e.g. speed) whilst still ensuring that the processing stage is utilised efficiently. For instance, where a pool of multiple sampling points is provided, at least some of the sampling points within the pool (or at least some of the components of those sampling points) may contain the same (i.e. equal) data values and undergo the same data processing, i.e. so that the processing would give the same result. Thus, according to embodiments of the technology described herein, before a given set of sampling points is processed, a comparison can be made at the input of the processing stage to determine whether any of the sampling points would give the same processing result. In other words, a "data equality" check is performed to determine whether the processing of any of the sampling points would be redundant. In this way, it may be possible to reduce the number of processing operations (cycles) that need to be performed to process the pool of sampling points.

For instance, when it is determined from this data equality check that two or more of the sampling points within the pool would give the same processing result when processed by the processing stage, the processing result may only be obtained for one of these sampling points, and the processing result can then be duplicated and written out for the other(s) of the sampling points that were determined to give the same processing result.

For example, where multiple sampling points are determined to contain equal data, in embodiments only one of these sampling points may be processed (and the other sampling points determined to give the same result may not be processed). At the same time, information regarding the location(s) of the other (unprocessed) sampling points that were determined to contain the same data can be generated. This information can thus be transmitted to the output so that the result of the processing for the sampling point that is processed by the processing stage can be duplicated for each of the other (unprocessed) sampling points and ultimately written out to the appropriate location. Thus, where multiple sampling points within the pool contain identical data, these multiple sampling points can effectively (all) be processed in a single cycle.

By contrast, in conventional systems where a data equality check is not performed (or e.g. where no such pool is provided) at the input, each of the sampling points would be processed separately, e.g. by iterating through all of the sampling points of all of the fragments essentially in the order that they are received at the processing stage. Thus, even where multiple of the sampling points to be processed contain identical data and in fact undergo the same processing, in conventional systems these would be processed separately, e.g. in multiple cycles. Embodiments of the technology described herein may therefore avoid redundant processing of sampling points having equal data values, and may thus provide improved processing performance (e.g. an increased speed and/or a reduction in processing power) compared to such conventional systems.

The technology described herein also extends to systems and apparatuses for graphics processing, e.g., and particularly, to graphics processing pipelines. Accordingly, a second embodiment of the technology described herein comprises a graphics processing pipeline for processing graphics fragments, wherein the graphics fragments each represent a set of one or more sampling points to be processed, and wherein the graphics processing pipeline comprises a plurality of processing stages, wherein at least one processing stage of the graphics processing pipeline comprises:

an input circuit for providing a pool of sampling points to be processed, wherein the number of sampling points within the pool of sampling points is greater than the number of sampling points that can be processed at the processing stage in a single cycle;

a comparator circuit for comparing sampling points within the pool of sampling of points with each other to determine whether multiple of the sampling points would give the same processing result when processed by the processing stage;

a processing circuit for processing the sampling points;

a control circuit for controlling which of the sampling points are processed by the processing circuit, wherein the control circuit is configured to, when it is determined that multiple of the sampling points would give the same processing result, cause a first one of those sampling points to be processed by the processing stage and generate location information for the other(s) of the multiple sampling points determined to give the same processing result to allow the other(s) of the multiple sampling points to subsequently be written out for their respective locations; and an output circuit for writing out the processing result for the sampling points, wherein the output circuit is configured to duplicate the result of the processing of the first sampling point and write out the duplicated result for the respective location(s) for each of the other(s) of the multiple sampling points that were determined to give the same processing result based on the associated location information.

The fragments that are processed in the manner of the technology described herein are typically generated by a rasteriser of the graphics processing pipeline. The rasteriser will receive graphics primitives for processing and generate graphics fragments for processing by later (e.g. rendering) stages of the graphics processing pipeline based on the sampling positions that the primitives are determined by the rasteriser to cover. The fragments may each have "fragment data", such as colour (e.g. red, green, blue (RGB) values), depth and/or transparency (e.g. alpha value) data, associated with them, with the fragment data for a given fragment in an embodiment being derived from primitive data associated with (the vertices of) the primitive to which the fragment relates.

The rasteriser of the graphics processing pipeline can be configured to operate in any suitable and desired manner, for example as in known rasterising arrangements. It should operate to generate graphics fragments for processing in dependence upon which sampling points (or which sets of sampling points) of an array of sampling points covering the area of the output of the graphics processing pipeline a given primitive, etc., received by the rasteriser covers (at least in part). The rasteriser in an embodiment generates a graphics fragment for each sampling point covered by, and/or for each set of plural sampling points (e.g., sampling mask) found to include a sampling point that is covered by, the (and each) primitive being rasterised.

Each fragment thus represents (has associated with it) a set of one or more sampling points. The sets of sampling points that the fragments represent may each contain any suitable number of sampling points. For instance, in some embodiments, the fragments to be processed each represent a set of at least (or of exactly) one, two, four, eight or sixteen sampling points.

The processing stage may be any suitable processing stage within a graphics processing pipeline. For instance, it will be understood that the processing stage may generally be implemented, as desired, as any suitable combination of processor or processors, controller or controllers, functional units, circuits/circuitry, processing logic, microprocessor arrangements, etc., that are operable to receive one or more sampling point(s) to be processed, and perform the required processing operation(s) on the sampling point(s) to give the processing result (which can then be passed to the output (circuit/circuitry) of the processing stage to be written out and passed to the next stage of the graphics processing pipeline). The processing stage (circuit/circuitry) may generally be configured to act in a pipelined fashion, e.g. to process a sampling point by performing a series of processing steps. That is, the processing stage may comprise one or more "processing pipelines" (that operate within the overall graphics processing pipeline). Again, a processing pipeline may generally be implemented, as desired, as any suitable combination of processor or processors, controller or controllers, functional units, circuit/circuitry, processing logic, microprocessor arrangements, etc., that are operable to receive one or more sampling point(s) to be processed, and perform the required processing operation(s) on the sampling point(s) to give the processing result.

Typically, the processing operation may comprise a multi-cycle operation. For instance, a single processing step may be performed in each cycle, with a sampling point that is being processed thus moving through a respective processing pipeline of the processing stage from cycle to cycle. Thus, in a first cycle, a first sampling point may enter a processing pipeline of the processing stage. In the next cycle, a first processing step may be performed on the first sampling points and a second sampling point may enter the processing pipeline, and so on, until all of the sampling points have passed through the processing pipeline. Thus, at any instance, multiple sampling points may be being processed within a given processing pipeline of the processing stage. In general, where the processing pipeline(s) are arranged to process sampling points on a "per sample" basis, each processing pipeline of the processing stage is able to receive a single (new) sampling point per cycle. The processing stage may therefore in an embodiment comprise a plurality of such processing pipelines so that multiple sampling points can be processed by the processing stage in parallel in each cycle. It is also contemplated, as explained further below, that the processing pipeline(s) may be arranged to process sampling points on a "per component" basis.

At the input of the processing stage there is provided a pool of (plural) sampling points to be processed. Typically, at any instant in time during the graphics processing process (e.g. except for when the final sampling points for the final fragments in the data stream are being processed), the pool contains a greater number of sampling points than can be processed in a single cycle. That is, for example, where the processing stage comprises one or more processing pipeline(s), the pool generally contains a greater number of sampling points than can be processed in a single cycle by the processing pipeline(s) of the processing stage. So, for instance, if the processing stage comprises two processing pipelines, each able to receive a single sampling point per cycle, the pool may accordingly contain more than two sampling points, such as four sampling points, or eight, twelve, etc., depending on the system.

The pool of sampling points may be formed as a result of the (prior) processing steps within the graphics processing pipeline, e.g. by virtue of there being a mismatch between the number of sampling points provided to the processing stage in a single instance to the number of sampling points that can be processed by the processing stage in a single cycle. For instance, the processing stage may be configured to receive or read out from memory "N" (e.g. four) sampling points in each cycle, whereas the processing stage is only capable of handling "M" (wherein M<N, e.g. two) new sampling points in a single cycle. That is, the pool of sampling points may be provided as a result of an unbalanced throughput within the graphics processing pipeline.

However, in embodiments, an input buffer may be provided for holding the pool of sampling points. That is, the input circuit/circuitry of the processing stage may in embodiments comprise an input buffer. In this way, it will be appreciated that a relatively larger sampling pool may be provided, e.g. depending on the size of the input buffer, potentially allowing for further improvements in processing efficiency. The size of the input buffer may generally be selected as desired, e.g. depending on the application and/or the desired number of sampling points to be stored.

Where sampling points contain equal (identical) data, the Applicants have recognised that these sampling points may undergo the same processing and give the same processing result. Thus, according to embodiments of the technology described herein, a comparison can be performed at the input of the processing stage to check whether (any of) the sampling points in the pool of sampling points would give the same processing result. (Where this is determined, one of the sampling points may be processed and the processing result for that sampling point may be duplicated for the others, as explained further below.) The comparison may be (and in an embodiment is) performed for all sampling points currently within the pool of sampling points. However, in principle, the comparison may be performed only on a subset of sampling points within the pool of sampling points. For example, the comparison may be stopped once a certain number of sampling points within the pool have been determined to give the same processing result, or after a certain number of comparisons have been made.

Whether the processing operation performed by the processing stage will produce the same result for multiple different sampling points can be determined in any suitable and desired manner. However, the Applicants have recognised that a processing operation which is to be performed in respect of a given sampling point will normally use (and the result of that processing operation will normally be dependent on) particular sample data that is associated with that sampling point. For instance, each sampling point may be, and typically is, associated with a number of components, or data values, e.g. representing the colours (red, green, blue, 'RGB'), transparency (alpha, 'A'), and optionally also depth, etc., associated with that sampling point.

In some cases it is known, or can be assumed, that where the components, or data values, are the same for different sampling points, the processing result for each of those sampling points will be the same. That is, in some cases, it is known that the processing operation will be the same for all sampling points that are to pass through the processing stage, irrespective of their same data values. Thus, in embodiments of the technology described herein, determining that the processing of multiple sampling points would produce the same result may comprise comparing the data values for the sampling points to determine that the multiple sampling points contain equal data. The comparison may thus be made (solely) on the basis of these data values or components.

However, in some cases, even where sampling points have the same data values, the processing of these sampling points may still give different results. For example, sampling points may be able to undergo different processing operations in the processing stage, and e.g. each of the sampling points may also therefore have associated control (or state) information that determines or specifies how the data for that sampling point is to be processed. Thus, in embodiments, e.g. where it cannot be assumed that the same data values will give the same processing result, the determination of whether two sampling points will give the same processing result may consider (compare) both the data values and the processing (operation(s)) that the sampling points are to undergo (e.g. control information of the sampling points). Thus, only when sampling points have equal data values and identical processing (e.g. control information) is it determined that the sampling points would give the same processing result.

As mentioned above, a fragment may correspond to a single sampling point. However, and in general, each fragment may represent (and be used to process) multiple (e.g. two, four, eight, sixteen, etc.) sampling points. In that case, each fragment is associated with multiple sampling points.

In some embodiments, the sampling points within the pool may all be sampling points in the set of sampling points represented by a single fragment. Thus, in that case, a comparison is made to determine whether any of the sampling points associated with that fragment would give the same processing result. However, it is also contemplated, that the pool may (also) contain sampling points associated with multiple different fragments. For instance, especially where an input buffer is provided, the input buffer may advantageously be used to pool sampling points represented by a plurality of different fragments thus allowing comparisons to be made from a greater number of different fragments. Thus, in embodiments, a comparison is made to determine whether any of the sampling points associated with one (a first) fragment would give the same processing result as one or more sampling points associated with another (a second) fragment.

Conventionally, all of the sampling points would be processed essentially in the order at which they are received at the processing stage, i.e. so that the sampling points of a first fragment are processed before the sampling points of the next fragment, and so on. However, the pool of sampling points that is provided in embodiments of the technology described herein is effectively a "queue" of sampling points to be processed. Furthermore, it will be appreciated that according to embodiments of the technology described herein the sampling points within the pool may generally be processed in any order. Embodiments of the technology described herein may therefore provide a re-ordering mechanism that may further improve the processing efficiency of the sampling points. For instance, when it is determined that a sampling point at the back in the pool of sampling points (e.g. a sampling point that was added to the pool relatively recently) would give the same processing result as a sampling point at the front of the pool, according to embodiments of the technology described herein that sampling point can effectively be processed earlier than would conventionally be the case.

For example, the input buffer may be used to store sampling points from multiple different fragments (e.g. from multiple cycles of the prior processing step(s) within the graphics processing pipeline). In conventional systems these would be processed in order so that the sampling points of the first fragment received at the processing stage would be processed before the sampling points of the second received fragment, etc. However, according to embodiments of the technology described herein, a comparison can be made between any of the sampling points within the pool and when it is determined that sampling points from different fragments would give the same processing result, the sampling points of the later (second) fragment may be processed earlier, e.g. along with sampling points of an earlier (first) fragment that were determined to give the same processing result.

The sampling points may be processed on a "per-sample" basis, i.e. as a whole. Thus, in embodiments, comparing sampling points within the pool of sampling of points with each other to determine whether multiple of the sampling points would give the same processing result when processed by the processing stage comprises determining whether the sampling points as a whole would give the same processing result. In that case, when it is determined that multiple of the sampling points would give the same processing result, the method may comprise processing only a first one of those sampling points (and generating the location information for the other(s) of the multiple sampling points that were determined to give the same processing result). Each of the multiple sampling points may then be written out, wherein the sampling point(s) that have not been processed are written out by duplicating the result of the processing of the first sampling point and writing out the duplicated result for the respective location(s) based on the associated location information.

Similarly, in this case, the control circuit/circuitry may be configured to, when it is determined that multiple of the sampling points would give the same processing result, cause only a first one of those sampling points to be processed (and generate the location information for the other(s) of the multiple sampling points that were determined to give the same processing result). The output circuit/circuitry may then write out each the multiple sampling points, wherein the sampling point(s) that have not been processed are written out by duplicating the result of the processing of the first sampling point and writing out the duplicated result to the respective location(s) based on the associated location information.

However, in other embodiments, the sampling points may be processed on a "per-component" (or "per-component, per-sample") basis. That is, the components (data channels) of each sampling point may be processed separately. In this case, instead of each processing pipeline of the processing stage handling sampling points as a whole, the processing pipeline(s) of the processing stage may be arranged to process individual data components. For example, each sampling point may have associated red, green, blue and alpha (RGBA) data components, and these may each be processed separately. Considered another way, the processing stage may comprise a plurality of "processing channels" each configured to process one or more individual components of a sampling point. In this case, where the sampling points are processed on a "per-component" basis, the method may involve comparing sampling points to determine whether one or more components of the sampling points would give the same processing result when processed by the processing stage. When it is determined that one or more components of multiple different sampling points would give the same processing result, the method may comprise processing those components of only one of the sampling points and duplicating the result of the processing of those components for those components for the other(s) of the multiple sampling points that were determined to give the same processing result for those components.

Similarly, in this case, the comparator circuit/circuitry may be configured to determine whether one or more components of the sampling points would give the same processing result when processed by the processing stage. The control circuit/circuitry may then be configured to, when it is determined that one or more components of multiple different sampling points would give the same processing result, cause those components of only one of the sampling points to be processed and duplicate the result of the processing of those components for the other(s) of the multiple sampling points determined to give the same processing result for those components.

Accordingly, in general, embodiments of the technology described herein may involve determining whether one or more components of multiple sampling points would give the same processing result. This determination may be made for the one or more components individually, i.e. on a "per-component" basis. Alternatively, the determination may be made based on all of the components, i.e. for the sampling points as a whole, i.e. on a "per-sample" basis. That is the one or more components may comprise all of the components. When it is determined that one or more components of multiple sampling points would give the same processing result, the one or more components of only one of these sampling points are processed, with the processing result(s) for those one or more components then being duplicated for the other(s) of the sampling points determined to give the same processing result for those one or more components. In other words, the "processing result" for a sampling point may be the result of processing the sampling point as a whole, or the result of processing one or more individual components of the sampling point.

When it is determined that multiple sampling points will give the same processing result, the technology described herein recognises that this processing result only needs to be obtained for one of the sampling points, i.e. since the processing of the other sampling points would be redundant. Thus, in embodiments, a first one of the multiple sampling points determined to give the same processing result is processed in order to obtain the processing result. The other sampling points need not be processed to give the processing result (and e.g. need not enter the processing pipeline, leaving space for other sampling points to be processed in that cycle).

Because the processing of the different sampling points would give the same processing result, the processing result for the sampling point that is processed can then be duplicated for any other sampling points that were determined to give the same processing result. That is, the processing result can be obtained from only one of the sampling points and then appropriately copied in order to write out the processing result for any other (in an embodiment all) sampling points that were determined to give the same processing result.

In principle, any of the multiple sampling points that are determined to give the same processing result may be selected as the (first) sampling point that is processed. However, typically, it will be the first sampling point within the pool (at the front of the pool which may e.g. be the oldest sampling point within the pool) that will be processed.

Naturally the sampling point that is processed can be written out (directly), e.g. in the normal manner. However, in order to be able to correctly write out the processing result for the other (unprocessed) sampling points, information indicative of the location(s) of those sampling points may be generated and provided to the output (circuit/circuitry) to allow the sampling points to be written out for the appropriate location i.e. within the output (e.g. output frame) of the graphics processing pipeline. The location information is thus typically generated at the input of the processing stage, e.g. by the comparator circuit/circuitry (or a further dedicated module for doing this), and then transmitted to the output. The location information may be passed through the processing pipeline(s) of the processing stage along with the sampling points that are being processed. However, in an embodiment, the location information is transmitted along a separate (dedicated) information channel, i.e. as side band information.

The location information for a sampling point thus generally indicates which of the sampling points would give the same processing result, and the respective (input) location for the sampling point. From the location information, the output circuit/circuitry can thus determine which data should be duplicated and where the duplicated data should then be written out e.g. to provide the desired output. That is, the location information generally includes information indicating which of the sampling points would give the same processing result, and the respective (input) locations for these sampling points, i.e. to tell the output (circuit/circuitry) which data to copy (i.e. from which place) for each of the unprocessed sampling points, and where to copy that data to.

Accordingly, once a sampling point has been processed at the processing stage (and for any sampling points that are processed), the processing result for that sampling point may be duplicated for any (all) other sampling points that have been determined to give the same processing result, and the processing result can then be written out to the correct location for the other sampling points using the generated location information associated with those sampling points.

As well as, or instead of, comparing multiple sampling points within the pool, it would also be possible to compare sampling points from the pool with sampling points that are currently being processed, e.g. sampling points that are currently within a processing pipeline of the processing stage. That is, when it is determined that a sampling point within the pool would give the same processing result as a sampling point that is currently being processed, the result of that processing may be duplicated for the sampling point within the pool (which would therefore not need to be processed) in a similar manner as described above. Thus, in embodiments, the method further comprises determining whether any sampling points yet to be processed would give the same processing result when processed by the processing stage as any sampling points that are currently being processed by the processing stage. When this determination is made, the processing result for the sampling point currently being processed by the processing stage can be duplicated in order to write out any sampling points that are yet to be processed but have been determined to give the same result. These sampling points therefore do not need to be processed. As above, information indicating the location(s) of the sampling point(s) that are yet to be processed (e.g. are still within the pool) can thus be provided to allow the processing result for the sampling point that is currently being processed to be duplicated at the output and written to the correct location.

For instance, in embodiments, a comparison is first made for the sampling points within the pool of sampling points to determine whether any of these would give the same processing result. Based on this, a number of 'unique' sampling points may then be scheduled for processing. However, before any of these are processed, a further comparison may be made with the sampling points currently being processed. When a match is found, the processing result for the sampling point currently being processed by the processing stage can be duplicated such that it is not necessary to process the new sampling point(s). Otherwise, when no match is found, the sampling points are processed, e.g. as described above.

In an embodiment the system is configured such that the processing stage is substantially fully utilised, e.g. so that there is a substantially continuous throughput of (new) sampling points through the processing pipeline(s) of the processing stage. That is, during the overall graphics processing operation, new sampling points may be passed substantially continuously to the processing pipeline(s) of the processing stage so that each processing pipeline receives a new sampling point (so long as there are still sampling points to be processed) during each cycle.

However, in other embodiments, one or more processing pipelines may be disabled, e.g. to save processing power, when it is determined that multiple sampling points to be processed at the processing stage would give the same processing result. This may be applied either on a "per-sample" or a "per-component" basis. For example, where this is applied on a "per-sample" basis, wherein each processing pipeline is configured to process a sampling point as a whole, each sampling point may be passed to a respective one of a plurality of processing pipeline(s) of the processing stage, and when it is determined that multiple sampling points would give the same processing result, only one of the sampling points is processed and the respective processing pipeline(s) for the other sampling points may be disabled. Similarly, where this is applied on a "per-component" basis, a plurality of processing pipelines (or channels) may be provided wherein each pipeline (channel) is configured to process one or more individual components of a sampling point. Thus, each of the sampling points may be scheduled for processing with a respective processing pipeline (channel) allocated for one or more individual components of the sampling points, and when it is determined that one or more components of multiple sampling points would give the same processing result, the processing result may be obtained for the one or more components of only one of the sampling points, with the processing pipeline(s) (channel(s)) for those components of the other(s) of the sampling points being disabled. The processing result for the sampling point or component(s) that are processed may then be duplicated for the other (unprocessed) sampling points or component(s).

Accordingly, another embodiment comprises a method of processing graphics fragments within a processing stage of a graphics processing pipeline, wherein the graphics fragments each represent a set of one or more sampling points to be processed, the method comprising:

providing a plurality of sampling points to be processed in parallel by a plurality of processing pipelines of the processing stage;

comparing the plurality of sampling points to determine whether multiple of the sampling points would give the same processing result when processed by the processing stage;

when it is determined that multiple of the sampling points would give the same processing result, processing a first one of those sampling points and disabling one or more respective processing pipeline (s) for the other(s) of the multiple sampling points determined to give the same processing result;

generating location information indicative of the respective location of the other(s) of the multiple sampling points determined to give the same processing result to allow the other(s) of the multiple sampling points to subsequently be written out for their respective locations; and writing out the processing result for the multiple sampling points by duplicating the result of the processing of the first sampling point and writing out the duplicated result for the respective location(s) for the other(s) of the multiple sampling points determined to give the same processing result based on the associated location information.

This embodiment also extends to a graphics processing pipeline. Thus, a further embodiment of the technology described herein comprises a graphics processing pipeline for processing graphics fragments, wherein the graphics fragments each represent a set of sampling points to be processed, and wherein the graphics processing pipeline comprises a plurality of processing stages, wherein at least one processing stage of the graphics processing system comprises:

an input circuit for providing a plurality of sampling points to be processed in parallel by a plurality of processing pipelines of the processing stage;

a comparator circuit for comparing the plurality of sampling points to determine whether multiple of the sampling points would give the same processing result when processed by the processing stage;

a processing circuit comprising a plurality of processing pipelines for processing a plurality of sampling points;

a control circuit for controlling which of sampling points are processed by the processing circuit, wherein the control circuit is configured to, when it is determined that multiple of the sampling points would give the same processing result, cause a first one of those sampling points to be processed and disable one or more respective processing pipeline (s) for the other(s) of the multiple sampling points determined to give the same processing result, wherein the control circuit is further configured to generate location information indicative of the respective location of the other(s) of the multiple sampling points determined to give the same processing result to allow the other(s) of the multiple sampling points to subsequently be written out for their respective locations; and an output circuit for writing out the processing result for the sampling points, wherein the output circuit is configured to duplicate the result of the processing of the first sampling point and write out the duplicated result for the respective location(s) for each of the other(s) of the multiple sampling points that were determined to give the same processing result based on the associated location information.

As explained above, the method and graphics processing pipeline according to these further embodiments may be configured to process sampling points either on a "per-sample" or on a "per-component" basis. Thus, when the sampling points are processed on a "per-sample" basis, each sampling point to be processed within a given cycle may be allocated a respective processing pipeline, and when it is determined that two or more sampling points would give the same processing result, only one of those sampling points is processed (by its respective processing pipeline), with the respective processing pipeline(s) for the other(s) of the sampling points determined to give the same processing result being disabled. Similarly, when the sampling points are processed on a "per-component" basis, one or more individual components of each sampling point to be processed within a given cycle may be allocated a respective processing pipeline, and when it is determined that two or more sampling points would give the same processing result for one or more components, only those one or more components for one of the sampling points is processed (by the respective processing pipeline(s)), with the respective processing pipeline(s) for those one or more components for the other sampling points determined to give the same processing result being disabled.

Generally, it will be understood that the technology described herein according to these embodiments may comprise any (or all) features described above in relation to the other embodiments of the technology described herein, at least to the extent they are not mutually exclusive. For instance, the steps of providing the pool of sampling points, comparing the sampling points, processing the (components of the) sampling points and writing out the sampling points may generally be performed in the same manner described above in relation to the first and second embodiments.

The embodiments relate to graphics processing systems, and particularly to various stages, or steps, within a graphics processing pipeline. The graphics processing pipeline is in an embodiment a tile-based rendering pipeline. The graphics processing pipeline may contain any suitable and desired processing stages that a graphics processing pipeline may contain. In an embodiment, it includes, in an embodiment in this order, one or more of, and in an embodiment all of: the above mentioned rasteriser; an early depth (or an early depth and stencil) tester; a renderer, in an embodiment in the form of a fragment shader; a varyings position evaluation (interpolator) associated with the fragment shader; a late depth (or depth and stencil) tester; a blender; one or more tile buffers (in the case of tile-based rendering pipeline); and a tile writeback unit (again in the case of a tile-based rendering pipeline).

The graphics processing operation that is performed in the manner of the technology described herein may be any suitable graphics processing operation performed within the graphics processing pipeline, for example any graphics processing operation which would ordinarily be performed within a graphics processing pipeline on a "per-sample" basis. In general, the graphics processing operation may be any operation where multiple data elements (sampling points) need to be processed and where it is known that at least some of the data elements may contain equal data. For example, a typical case where this might arise would be during a blending operation, although other arrangement would of course be possible. Thus, in an embodiment, the graphics processing operation is (at least) one of: a rendering operation, such as a fragment shading or blending operation; a culling test, such as a depth test or stencil test; and a multisampled resolve and writeback operation.

Correspondingly, the graphics processing stage that operates in the manner of the technology described herein may be any suitable stage of the graphics processing pipeline, for example any graphics processing stage which would ordinarily operate on a "per-sample" basis. In an embodiment, the graphics processing stage is (at least) one of: a rendering stage, such as a fragment shading or blending stage; a culling stage, such as a depth test or stencil test stage; and a multisampled resolve and writeback stage.

In embodiments, graphics processing in manner of the technology described herein may be performed in respect of more than one graphics processing operation to be performed on the graphics fragments and/or at more than one stage of the graphics processing pipeline. Thus, in an embodiment, the graphics processing pipeline includes two (or more than two) processing stages that operate in the manner of the technology described herein.

Although the technology described herein has been described above primarily with reference to the processing of a particular graphics fragment, or set of sampling points, as will be appreciated by those skilled in the art, this operation is in an embodiment performed for and in respect of plural graphics fragments (and in an embodiment each graphics fragment) that the rasteriser generates and/or the processing stage receives for processing. Similarly, as a render output to be generated by the graphics processing pipeline will typically be made up of plural primitives (and tiles in a tile-based system), in practice the method of the technology described herein will be repeated for each primitive (and tile) making up the output, so that eventually an appropriate set of rendered fragment data has been generated for each sampling point of the output that is needed.

Where the graphics processing is using multiple render targets, then in an embodiment, the operation in the manner of the technology described herein is done independently per render target (i.e. such that for a given render target, each fragment and pixel will be treated independently of the corresponding fragments and pixels in the other render targets, i.e. such that a particular pixel can have multiple values in one render target, but a single value in another render target).

The technology described herein can be used for all forms of output that a graphics processing pipeline may be used to generate, such as frames for display, render-to-texture outputs, etc.

In some embodiments, the graphics processing pipeline comprises, and/or is in communication with, one or more memories and/or memory devices that store the data described herein, such as the fragment data, other sample data, metadata etc., and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuit/circuitry, processing logic, microprocessor arrangements, etc., that are operable to perform the various functions, etc., such as appropriately configured dedicated hardware elements or processing circuit/circuitry, and/or programmable hardware elements or processing circuit/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit/circuitry, if desired.

The technology described herein is applicable to any form or configuration of graphics processing pipeline and to all forms of rendering, such as immediate mode rendering, deferred mode rendering, tile-based rendering, etc. It is particularly applicable to graphics renderers that use deferred mode rendering and in particular to tile-based renderers.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus a further broad embodiment of the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Although various embodiments of the technology described herein have been described above in relation to graphics processing it will be appreciated that the technology described herein may also be applied to other data processing systems where similar considerations apply, i.e. wherein multiple data elements need to be processed and wherein it is known that multiple of these data elements may give the same processing result. Thus, in further embodiments, there are provided methods of data processing and data processing pipelines substantially as described above but wherein any reference to "graphics" processing is replaced by a reference to "data" processing. Thus, instead of processing a plurality of fragments represented by a set of one or more sampling points, in these embodiments, a set of one or more "data elements" may be processed.

An embodiment of the technology described herein will now be described in the context of the processing of computer graphics for display.

As discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1, which shows schematically a portion of an image to be displayed, shows the repeated application of a sampling mask 34 to an image to be displayed. Each application of the sampling mask 34 corresponds to a pixel of the image as it will be displayed. Each sampling mask includes a set of sampling points 36 that will be used to sample the image for the output pixel in question and accordingly determine how the pixel is to be displayed on the final display.

Figure 2:
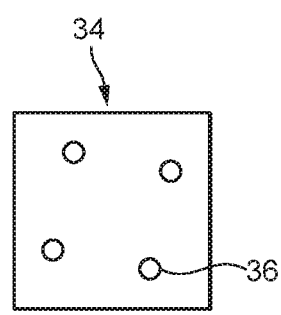
FIG. 2 shows an exemplary sampling pattern for use in an embodiment of the technology described herein.

In the example shown in FIG. 1, each instance of the sampling mask 34 has four sampling points 36. FIG. 2, which shows an isolated view of the sampling mask 34, illustrates this. That is, FIG. 2 shows a 4× sampling mask 34 which represents an array of four sampling points 36 which correspond to four sampling positions 38 for a given pixel of a render output to be generated. However, it will be appreciated that it is not necessary to use a 4× sampling mask 34. For instance, in embodiments, each pixel may be sampled only once (i.e. so that there is only a single sampling point for each pixel). Similarly, in other embodiments, other sampling rates (e.g. 2×, 8×, 16×) may suitably be used.

FIG. 1 also shows an image overlaid on the sampling mask array 30 in the form of a single primitive 32. It will be appreciated here that the image has been shown in FIG. 1 as comprising a single primitive for simplicity. In practice the image (or other output) may and typically will comprise many, overlapping, primitives. As can be seen from FIG. 1, the primitive 32 overlies some of the sampling masks in the sampling mask array 30 completely (outlined in bold), but only passes through part of some of the other sampling masks.

To process the primitive 32 of the image, the rendering system will, in essence, determine at the rasterisation stage which of the sample points in each set of sample points of each sampling mask application are covered by the primitive 32, and then render and store data for those covered sample points so that the image of the primitive 32 can be properly displayed on the display device.

The processing of the image of the primitive 32 for display in this manner in the present embodiment will now be described with reference to FIG. 3 which shows schematically a graphics processing pipeline 1 that may operate in accordance with the technology described herein. Other arrangements for the graphics processing pipeline would, of course, be possible.

Figure 3:
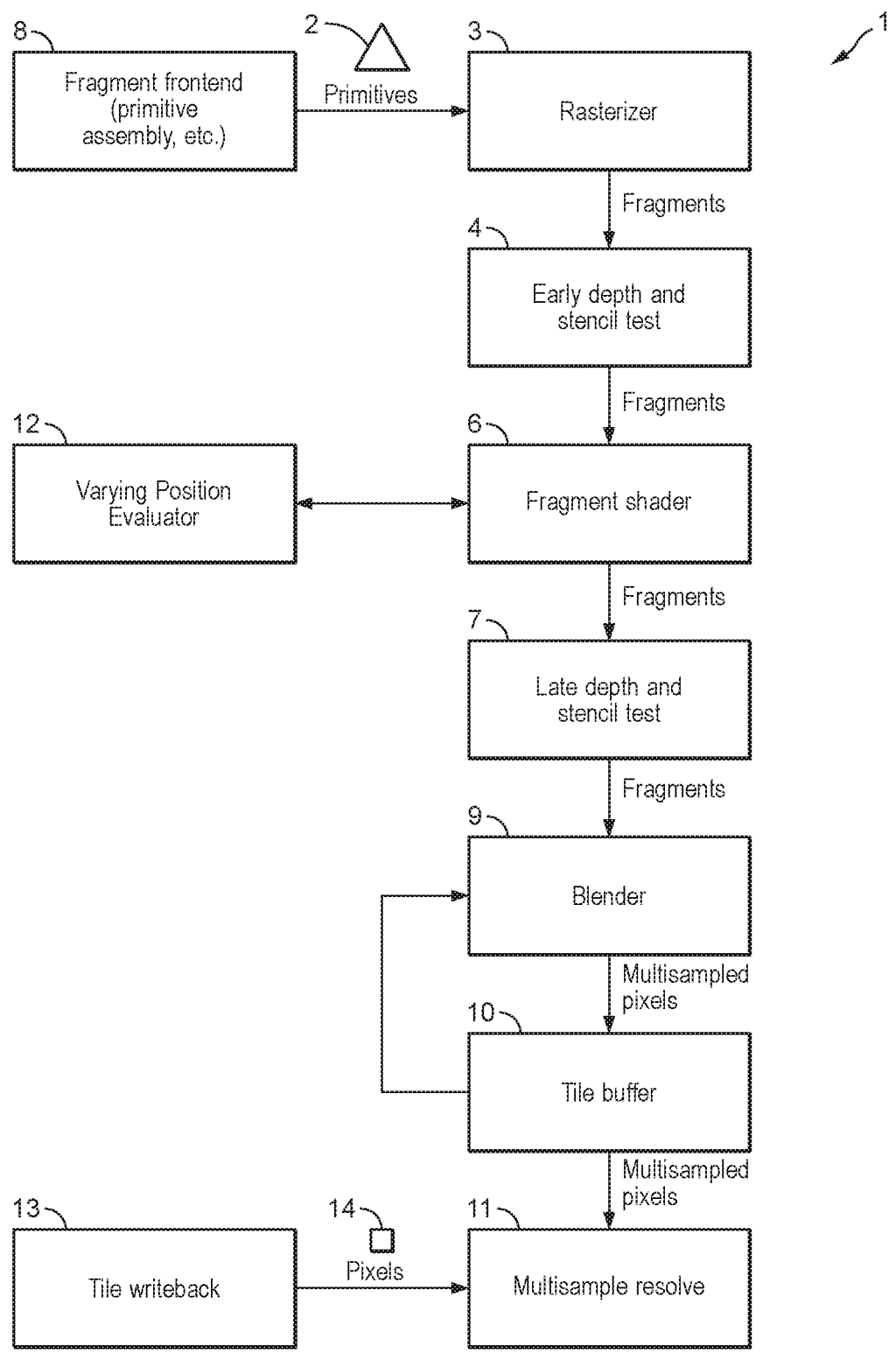
FIG. 3 shows an example of a graphics processing pipeline that can be operated in accordance with embodiments of the technology described herein.

The graphics processing pipeline 1 shown in FIG. 3 is a tile-based renderer and thus will produce tiles of a render output data array, such as an output frame to be generated. As will be appreciated by those skilled in the art, other rendering arrangements can be used, if desired.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

FIG. 3 shows the main elements and pipeline stages of the graphics processing pipeline 1 that may be relevant to the operation of the present embodiment. As will be appreciated by those skilled in the art there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processing pipeline as shown in FIG. 3 may be implemented as desired and will accordingly comprise, e.g., appropriate circuit/circuitry and/ or processing logic, etc., for performing the necessary operation and functions.

FIG. 3 shows schematically the pipeline stages after the graphics primitives (polygons) 2 for input to the rasterisation process have been generated. Thus, at this point the graphics data (the vertex data) has undergone fragment frontend operations 8, such as transformation and lighting operations (not shown), and a primitive set-up stage (not shown) to set-up the primitives to be rendered, in response to the commands and vertex data provided to the graphics processor.

As shown in FIG. 3, this part of the graphics processing pipeline 1 includes a number of stages, including a rasterisation stage 3, an early Z (depth) and stencil test stage 4, a fragment shading stage 6, a late Z (depth) and stencil test stage 7, a blending stage 9, tile buffers 10 and a downsampling and writeback (multisample resolve) stage 11.

The rasterisation stage 3 of the graphics processing pipeline 1 operates to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

The early Z/stencil stage 4 performs a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffers 10) to determine whether the new fragments will be occluded by fragments that have already been rendered (or not). At the same time, an early stencil test is carried out. The early depth and stencil testing stage 4 may be configured to be able to perform a single depth and stencil test per clock cycle.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired. The fragment shader 6 is configured to always process all the sampling points associated with a fragment that it receives as a whole.

The fragment shading stage 6 has associated with it a varying interpolator (a varying position evaluator) 12 which is used to determine the correct varying value for the current fragment. For certain interpolation modes, such as centroid mapping, the varying interpolator uses the fragment's associated coverage mask to select the correct position within the fragment to interpolate the varying data for. Thus, the varying interpolator 12 is configured to be able to process all the sampling points associated with a fragment that it receives in parallel, so as to be able to select the correct interpolation position for centroid mapping.

There is then a "late" fragment Z and stencil test stage 7, which carries out, inter alfa, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shading stage 6 with the depth values of fragments that have already been rendered (stored in the depth buffer). This late fragment depth and stencil test stage 7 also carries out any necessary "late" alpha and/or stencil tests on the fragments.

The fragments that pass the late fragment test stage 7 may then be subjected to, as required, any necessary blending operations with fragments already stored in the tile buffers 10 in the blender 9. Any other remaining operations necessary on the fragments, such as dither, etc. (not shown) may also be carried out at this stage.

Finally, the (blended) output fragment data (values) are written to the tile buffers 10 from where they can, for example, be output to a frame buffer for display. The depth value for an output fragment is also written appropriately to a Z-buffer within the tile buffers 10. The tile buffers and Z-buffer will thus store appropriate colours, etc., or Z-values for the sampling points that the buffers represent. The tile buffers store an array of sample data that represents part of the render output (e.g. image to be displayed). A plurality of tile buffers may be provided. For instance, in embodiments, three tile buffers may be provided with two of the three tile buffers are used to store colour (red, green, blue) values for each sampling point (it would be possible to use one tile buffer for this purpose, but two is more typical), and one tile buffer is used to store Z (depth) values and stencil values for each sampling point. Other arrangements would, of course, be possible. These tile buffers may be provided as separate buffers, or may in fact all be part of the same, larger buffer. They are located on (local to) the graphics processing pipeline (chip).

The data from the tile buffers 10 is then input to a downsampling (multisample resolve) unit 11, and thence output (written back) to an output buffer 13 (that may not be on the graphics processing platform itself), such as a frame buffer of a display device (not shown). The display device could comprise, e.g., a display comprising an array of pixels, such as a computer monitor or a printer.

The downsampling unit 11 downsamples the sample data stored in the tile buffers 10 to the appropriate resolution for the output buffer (device) (i.e. such that an array of pixel data corresponding to the pixels of the output device is generated), to generate output values (pixels) 14 for output to the output buffer 13. This downsampling can take place in any suitable manner. In the present embodiment linear blending of the data is used to downsample it. However, other arrangements would be possible, if desired. If needed, the downsampling unit 11 may also apply appropriate gamma correction to the data that it outputs to the output buffer 13, or this may be done, e.g., as a fragment shading operation, or in any other suitable and desired manner.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed).

Thus, the fragments are processed at various stages within the graphics processing pipeline. It will be appreciated that the present techniques may generally be applied to any suitable and desired processing stage(s) of the graphics processing pipeline. However, in embodiments, as will be exemplified below, the present techniques may be applied to the blender 9 stage of the graphics processing pipeline 1.

For example, at the blender stage 9, in each cycle a plurality of fragments (e.g. four) may be received for the blend operation. Each fragment may in turn contain one, four, eight, sixteen, etc., sampling points to be processed and each sampling point generally has four components (i.e. Red, Green, Blue and Alpha, ('RGBA')). In this example, the same colour blend operation is applied to all 'RGB' components and the same alpha blend operation is applied to all 'A' components. However, in principle, different operations may be applied to different components. In this case, each sampling point may also have ecifying which operation(s) should be performed.

Figure 4:
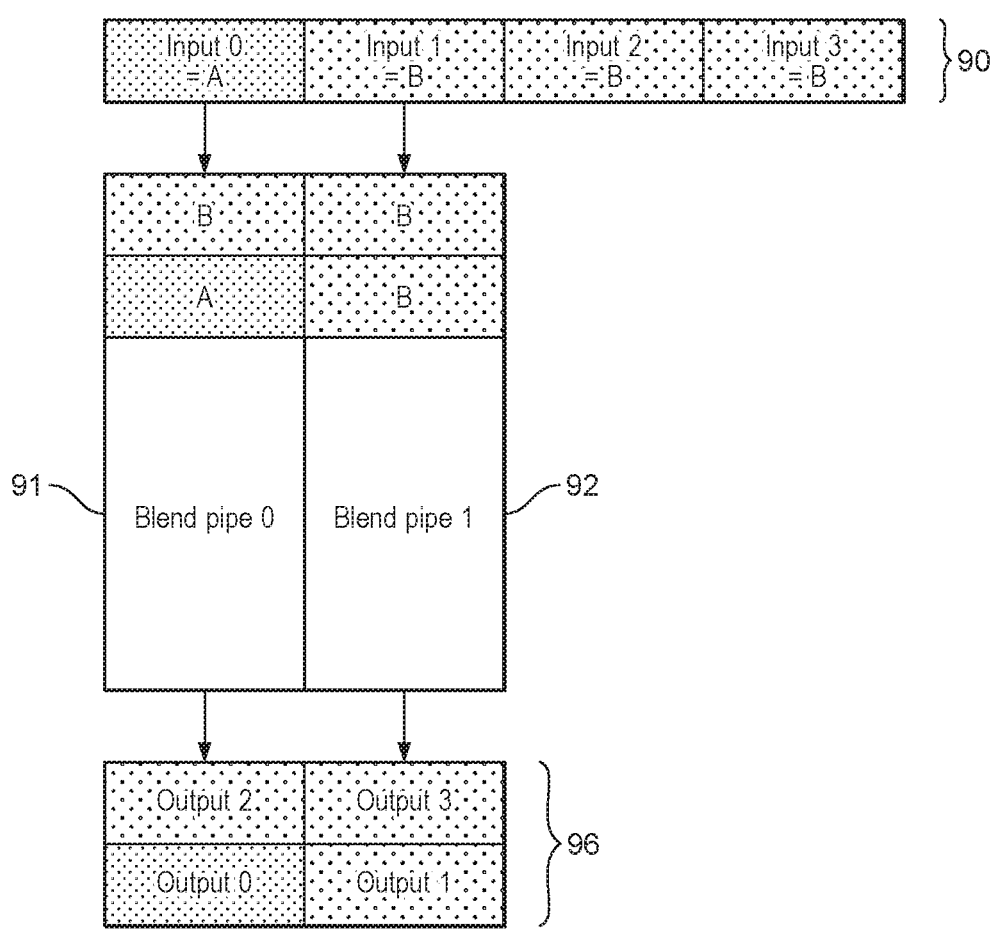
FIG. 4 shows an example of a graphics processing (blending) operation performed in a conventional manner.

FIG. 4 shows an example of a blender operation performed according to a conventional method. As shown, the blender stage comprises two blend pipes 91, 92. Each of these blend pipes 91, 92 is capable of handling one new sampling point per cycle. Accordingly, in each cycle, the blender stage is capable of handling two new sampling points. However, for the example shown in FIG. 4, there are four sampling points to be processed at the input 90 of the processing stage (at the respective Inputs "0", "1", "2" and "3"). In the conventional operation shown in FIG. 4, all of the sampling points (of all of the pixels) are iterated over during the blending operation. Thus, as shown in FIG. 4, the two sampling points at Inputs "0" and "1" are first passed into the blend pipes 91, 92 (where they are processed and written out at the output 96 of the blender) and then the two sampling points at Inputs "2" and "3" are passed to the blend pipes 91, 92 in the next cycle. In this example, the four sampling points are therefore passed to the blend pipes 91, 92 in two separate cycles.

However, it can be seen in the example shown in FIG. 4 that the sampling points at each of Inputs "1", "2" and "3", in fact contain identical data values (i.e. 'B'), and therefore give the same processing result at the output 96. This redundancy is exploited in embodiments of the technology described herein.

Figure 5:
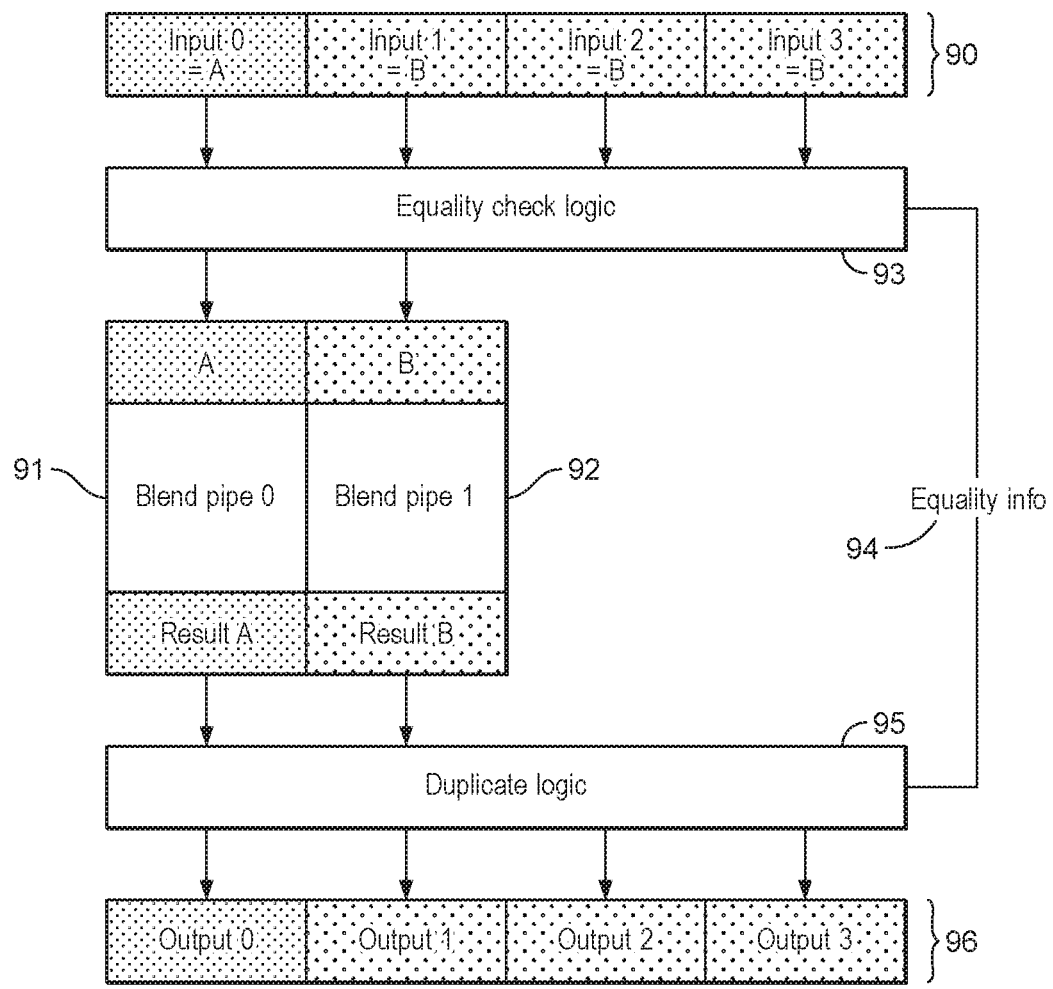
FIG. 5 shows an example of a graphics processing (blending) operation according to an embodiment of the technology described herein.

FIG. 5 shows an example of a blender operating according to an embodiment of the technology described herein. Again, the blender comprises two blend pipes 91, 92 and is capable of receiving two sampling points per cycle. However, equality check logic 93 is now provided at the input of the blender stage. Prior to passing any of the sampling points into the blend pipes for processing, an equality check may thus performed at the input of the blender stage to determine whether any of the sampling points would give the same processing result. In this example, the first sampling point to be processed, at Input "0", contains the value 'A'. However, all of the other sampling points, at Inputs "1", "2" and "3", contain the same value 'B'. That is, each of sampling points at Inputs "1", "2" and "3" has identical RGBA values. Thus, the equality check logic 93 determines that the sampling points at each of Inputs "1", "2" and "3" would give the same processing result (i.e. 'B'). In this case it is only necessary to perform blending on the two unique data values, i.e. 'A' and 'B' (rather than for each of the four sampling points). Thus, where multiple of the sampling points contain identical data values, as in this example, the number of blending executions can be reduced accordingly. For instance, as shown in FIG. 5, according to the illustrated scheme only the two sampling points at Inputs "0" and "1" are processed, whereas the sampling points at Inputs "2" and "3" are not processed. The processing result from the sampling point at Input "1" can then be duplicated by suitable duplicate logic 95 provided at the output of the processing stage and copied to the appropriate locations in order to write out the data for each of the four sampling points at the input. Thus, in this example, the performance has been improved twofold, as now all of the sampling points can effectively be processed in a single operation.

As shown, in order to allow the duplicated results to be written out to the correct locations, equality information 94 may be passed from the equality check module 93 to the duplicate logic 95, with this information telling the duplicate logic 95 which data values to copy (here 'B') and where to copy it to (here, the Outputs "2" and "3"). The equality information 94 may generally therefore include information ("location information") indicating the locations of the sampling points that are not processed to allow the processing result for the sampling point(s) that are processed to be suitably copied to the proper location.

Figure 6:
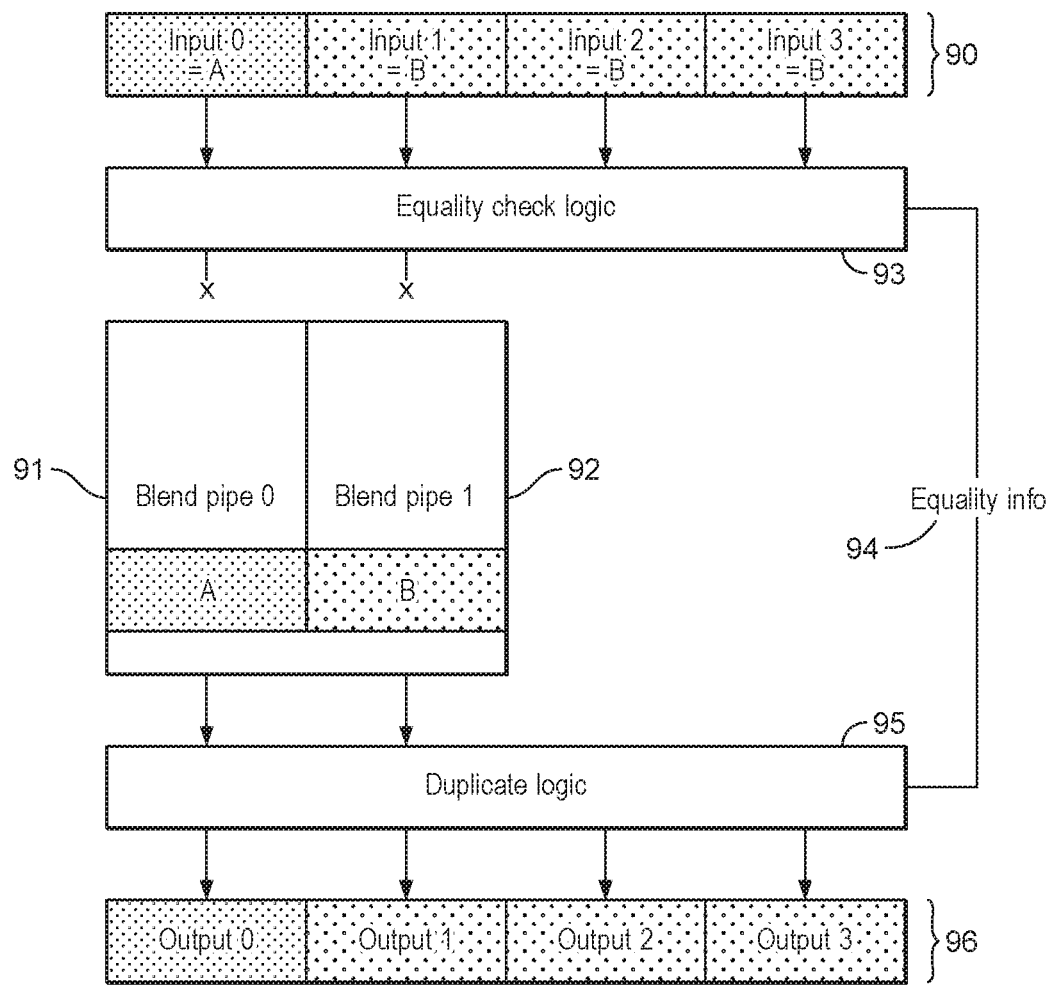
FIG. 6 illustrates another example of a graphics processing (blending) operation according to an embodiment of the technology described herein.

In the example shown in FIG. 5, the equality check is performed only using the sampling points at the input. However, it would also be possible to perform a similar equality check for sampling points that are currently being processed within the blend pipes 91, 92. An example of this is illustrated in FIG. 6. As shown in FIG. 6, there are again four sampling points at the input, one of which (at Input "0") contains the data value 'A' whereas the other three (at Inputs "1", "2" and "3") contain the data value 'B'. However, in this example, sampling points containing these same data values ('A' and 'B') are already present and being processed within the blend pipes 91, 92. In this case, it is not necessary to process any of the sampling points at the input. Instead, the processing results for the sampling points within the pipeline can be duplicated and written out to the appropriate location using appropriately generated equality information 93, in essentially the same manner as described above.

Figure 7:
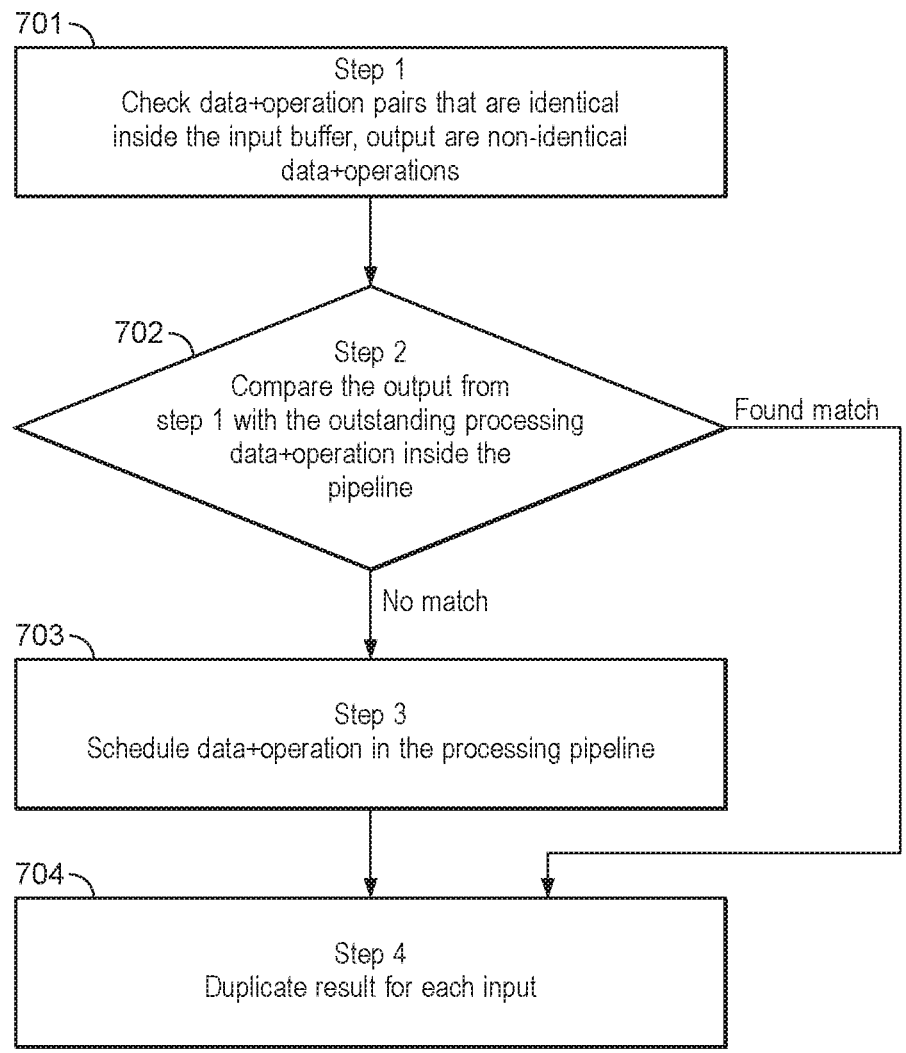
FIG. 7 is a flow chart illustrating a method according to an embodiment of the technology described herein.

FIG. 7 is a flow chart illustrating the steps performed in accordance with embodiments of the technology described herein. In a first step (step 701), a check is performed to see whether any sampling points at the input would give the same processing result (i.e. have the same data and operation attributes). Any sampling points that are not redundant can then be provided to the next stage wherein a further check is performed to see whether any of these would give the same processing result as any sampling points currently within the pipeline (step 702). If that is not the case, the unique sampling points are scheduled for processing in the processing pipeline. The processing result for these can then be duplicated for each input (step 704) for any other redundant sampling points that were not processed. Similarly, if any of the sampling points output from the first step (step 701) do match sampling points within the pipeline, those sampling points do not need to be processed and instead the processing result for those currently within the pipeline can be duplicated for each input (step 704).

In embodiments, the number of sampling points arriving at the input of the processing stage may be determined by the processing operation, i.e. by the number of sampling points read from memory to the processing stage during a single read operation. Depending on the system, all of the sampling points arriving at the input of the processing stage in a given instance may comprise sampling points associated with a single fragment. Thus, the comparisons described above may be made for different sampling points representing the same fragment. However, it is also contemplated that multiple sampling points may be provided to the processing stage that relate to a plurality of different fragments. In this case, the comparisons may be made between sampling points from multiple different fragments. For example, an input buffer may suitably be provided in order to increase the number of sampling points that are held, and thus available for comparison, at the input of the processing stage.

Figure 8:
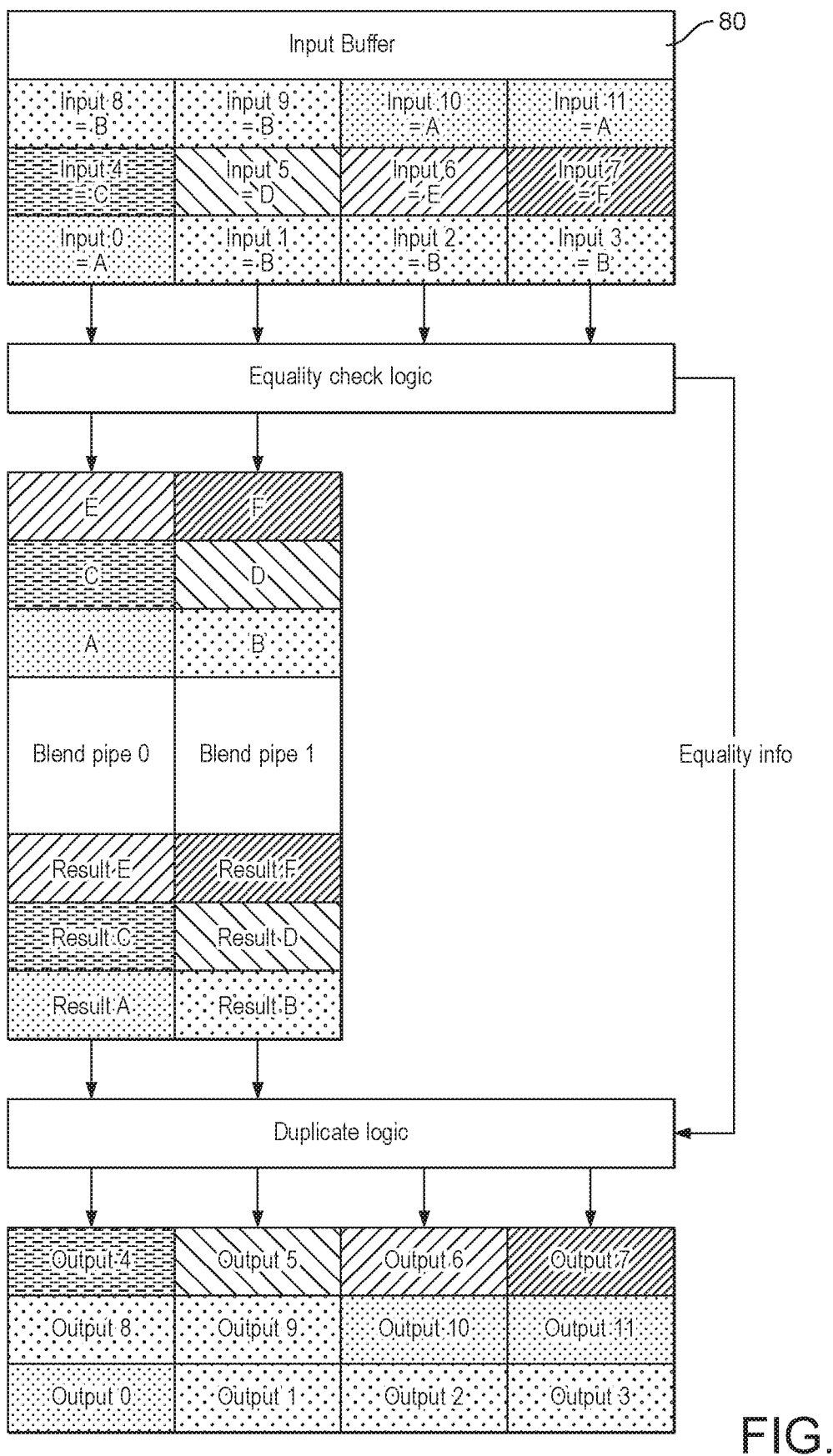
FIG. 8 shows an example of a processing stage including an input buffer is used to provide a larger pool of sampling points representing multiple different fragments.

An example of this is illustrated in FIG. 8. In FIG. 8, an input buffer 80 is provided that contains a plurality of sampling points (associated with multiple different fragments). An equality check can thus be performed for all of the sampling points within the input buffer 80 to check for redundant data. For example, as shown, the sampling points at Inputs "0", "10" and "11" all contain the same data value 'A'. Thus, only the sampling point at Input "0" needs to be processed and this result can then be duplicated for those at Inputs "10" and "11". It will be appreciated that the order in which the sampling points are processed may thus be changed, e.g. so that sampling points further back within the buffer are effectively brought forward and processed earlier than they would otherwise be (e.g. when the operation is performed according to the scheme illustrated in FIG. 4 where the blender iterates over all of the sampling points in order). The use of an input buffer 80 may therefore provide further improvements in processing efficiency.

In the examples described above the processing pipeline is fully utilised, i.e. so that at any given instance, there is an essentially continuous throughput of sampling points to the blend pipes 91, 92 of the blender stage 9. However, in other arrangements, as illustrated in FIG. 9, when it is determined that multiple sampling points to be processed would give the same processing result one or more channels of the pipelines may be disabled, e.g. in order to save processing power.

Figure 9:
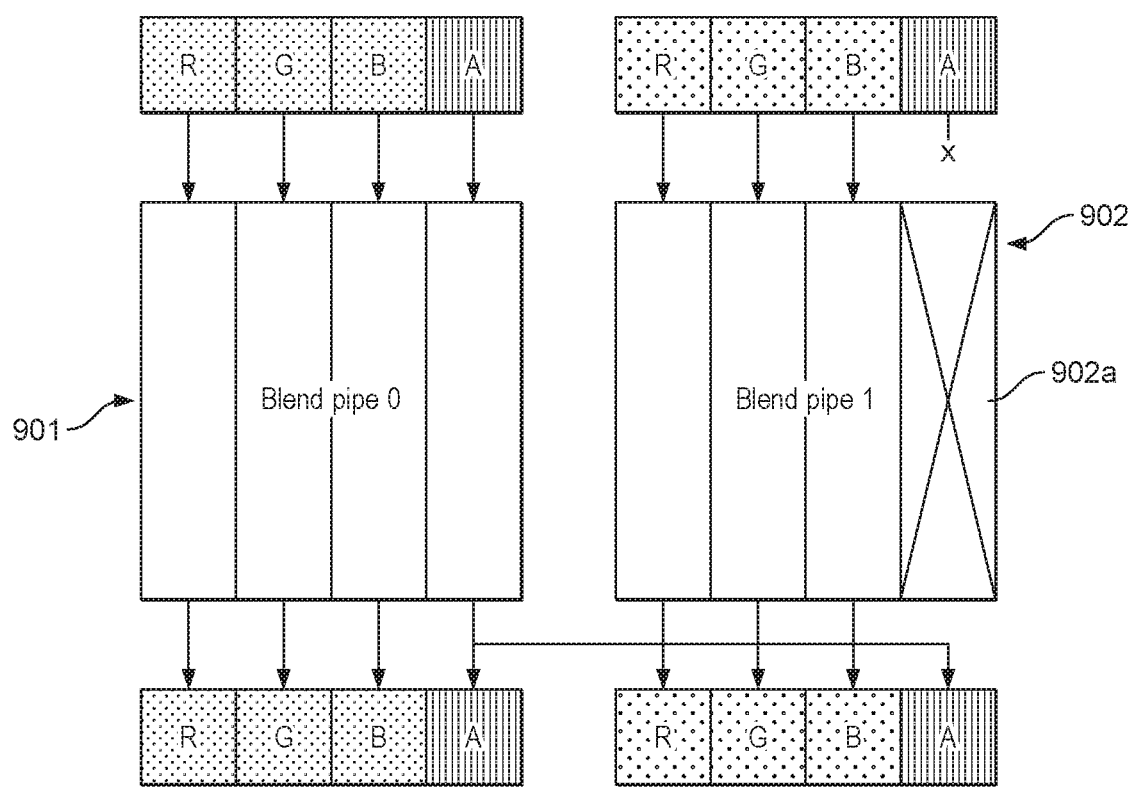
FIG. 9 shows an example of a graphics processing (blending) operation in accordance with another embodiment of the technology described herein.

For example, as shown in FIG. 9, there are two sampling points to be processed, each sampling point having four components (RGBA). Each of the sampling points is being processed by a respective blend pipe 901, 902 and each blend pipe 901, 902 has a plurality of channels for processing the individual components of the two sampling points. In this example, the RGB values for the two sampling points are different. However, the two sampling points share the same 'A' value. Thus, only the 'A' value for the first sampling point needs to be processed and this result can then be duplicated for the other sampling point. Accordingly, the 'A' channel 902A for the blend pipe 902 used to process the second sampling point can be disabled, and the processing result for the 'A' component from the first sampling point can be duplicated, e.g. in a similar manner to that described above.

Although FIG. 9 shows an example of "per-component" processing it will be appreciated that the scheme illustrated there may also generally be applied to "per-sample" processing.

Similarly, although FIGS. 4 to 8 have primarily been described with reference to "per-sample" processing, again, these may equally be applied to "per-component" processing.

The drawings show elements of data processing apparatuses and systems that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings (or, conversely, where elements are shown as sharing significant hardware circuits, these may in practice comprise separate elements).

As discussed above, embodiments of the technology described herein relate to graphics processing. However, it will be appreciated that the present technology may also be applied to other data processing systems where similar considerations apply, i.e. wherein multiple data elements need to be processed and wherein it is known that multiple of these data elements may give the same processing result.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of processing graphics fragments within a processing stage of a graphics processing pipeline, wherein the graphics fragments each represent a set of one or more sampling points to be processed, the method comprising:

providing a pool of sampling points to be processed, wherein the number of sampling points within the pool of sampling points is greater than the number of sampling points that can be processed by the processing stage in a single cycle;

comparing sampling points within the pool of sampling of points with each other to determine whether multiple of the sampling points would give the same processing result when processed by the processing stage;

when it is determined that multiple of the sampling points would give the same processing result, processing a first one of those sampling points and generating location information for the other(s) of the multiple sampling points that were determined to give the same processing result, wherein the location information contains information indicative of the respective location of the other(s) of the multiple sampling points to allow the other(s) of the multiple sampling points to subsequently be written out for their respective locations; and writing out the processing result for each of the multiple sampling points by duplicating the result of the processing of the first sampling point and writing out the duplicated result for the respective location(s) for each of the other(s) of the multiple sampling points that were determined to give the same processing result based on the associated location information.

2. A method as claimed in claim 1, wherein when it is determined that multiple of the sampling points would give the same processing result, processing only a first one of those sampling points, and wherein writing out each of the multiple sampling points comprises duplicating the result of the processing of the first sampling point for each of the other(s) of the multiple sampling points that that have not been processed but were determined to give the same processing result.

3. A method as claimed in claim 1, wherein comparing the sampling points within the pool of sampling points to determine whether multiple of the sampling points would give the same processing result when processed by the processing stage comprises determining whether processing of one or more components of the sampling points would give the same processing result, and wherein when it is determined that one or more components of multiple sampling points would give the same processing result, processing only the one or more components of a first one of those multiple sampling points.

4. A method as claimed in claim 1, comprising comparing sampling points within the pool of sampling of points to determine whether multiple of the sampling points contain equal data.

5. A method as claimed in claim 1, wherein each of the sampling points has associated control information that determines the processing operation(s) to be performed by the processing stage for that sampling point, the method comprising comparing sampling points within the pool of sampling of points to determine whether multiple of the sampling points contain equal data and have the same control information so that processing of the sampling points would give the same processing result.

6. A method as claimed in claim 1, further comprising comparing one or more sampling points within the pool of sampling of points with sampling points that are currently being processed by the processing stage to determine whether one or more sampling point(s) within the pool would give the same processing result as a sampling point that is currently being processed, and when it is determined that one or more sampling point(s) within the pool would give the same processing result as a sampling point that is currently being processed, writing out the processing result for the one or more sampling point(s) within the pool that are determined to give the same processing result as a sampling point that is currently being processed by duplicating the result of the processing for the sampling point that is currently being processed.

7. A method as claimed in claim 1, wherein the pool of sampling points is held within an input buffer.

8. A method as claimed in claim 1, wherein the sampling points within the pool of sampling points relate to a single fragment.

9. A method as claimed in claim 1, wherein the sampling points within the pool of sampling points relate to a plurality of different fragments and wherein a comparison is made to determine whether multiple sampling points from different fragments would give the same processing result when processed by the processing stage.

10. A graphics processing pipeline for processing graphics fragments, wherein the graphics fragments each represent a set of one or more sampling points to be processed, and wherein the graphics processing pipeline comprises a plurality of processing stages, wherein at least one processing stage of the graphics processing pipeline comprises:
    an input circuit for providing a pool of sampling points to be processed, wherein the number of sampling points within the pool of sampling points is greater than the number of sampling points that can be processed at the processing stage in a single cycle;
    a comparator circuit for comparing sampling points within the pool of sampling of points with each other to determine whether multiple of the sampling points would give the same processing result when processed by the processing stage;
    a processing circuit for processing the sampling points;
    a control circuit for controlling which of the sampling points are processed by the processing circuit, wherein the control circuit is configured to, when it is determined that multiple of the sampling points would give the same processing result, cause a first one of those sampling points to be processed by the processing stage and generate location information for the other(s) of the multiple sampling points determined to give the same processing result to allow the other(s) of the multiple sampling points to subsequently be written out for their respective locations; and
    an output circuit for writing out the processing result for the sampling points, wherein the output circuit is configured to duplicate the result of the processing of the first sampling point and write out the duplicated result for the respective location(s) for each of the other(s) of the multiple sampling points that were determined to give the same processing result based on the associated location information.

11. A graphics processing pipeline as claimed in claim 10, wherein:
    the control circuit is configured to, when it is determined that multiple of the sampling points would give the same processing result, cause only a first one of those sampling points to be processed; and wherein
    the output circuit is configured to write out each of the multiple sampling points by duplicating the result of the processing of the first sampling point for each of the other(s) of the multiple sampling points that that have not been processed but were determined to give the same processing result.

12. A graphics processing pipeline as claimed in claim 10, wherein:
    the comparator circuit is configured to compare the sampling points within the pool of sampling points to determine whether processing of one or more components of the sampling points would give the same processing result; and wherein
    the control circuit is configured to, when it is determined that one or more components of multiple sampling points would give the same processing result, cause only the one or more components of a first one of those multiple sampling points to be processed.

13. A graphics processing pipeline as claimed in claim 10, wherein the comparator circuit is configured to compare sampling points within the pool of sampling points to determine whether multiple of the sampling points contain equal data.

14. A graphics processing pipeline as claimed in claim 13, wherein each of the sampling points has associated control information that determines the processing operation(s) to be performed by the processing stage for that sampling point, and wherein the comparator circuit is configured to compare sampling points within the pool of sampling of points to determine whether multiple of the sampling points contain equal data and have the same control information so that processing of the sampling points would give the same processing result.

15. A graphics processing pipeline as claimed in claim 10, wherein:
    the comparator circuit is further configured to compare sampling points within the pool of sampling of points with sampling points that are currently being processed by the processing stage to determine whether one or more sampling point(s) within the pool would give the same processing result as a sampling point that is currently being processed, and when it is determined that one or more sampling point(s) within the pool would give the same processing result as a sampling point that is currently being processed; and wherein
    the output circuit is configured to write out the processing result for the one or more sampling point(s) within the pool that are determined to give the same processing result as a sampling point that is currently being processed by duplicating the result of the processing for the sampling point that is currently being processed.

16. A graphics processing pipeline as claimed in claim 10, wherein the input circuit comprises an input buffer for holding the pool of sampling points.

17. A graphics processing pipeline as claimed in claim 10, wherein the input circuit is arranged to hold a plurality of sampling points relating to a single fragment.

18. A graphics processing pipeline as claimed in claim 10, wherein the input circuit is arranged to hold a plurality of sampling points relating to a plurality of different fragments so that the comparator circuit is operable to compare sampling points representing different fragments.

19. A method of processing graphics fragments within a processing stage of a graphics processing pipeline, wherein the graphics fragments each represent a set of one or more sampling points to be processed, the method comprising:
    providing a plurality of sampling points to be processed in parallel by a plurality of processing pipelines of the processing stage;
    comparing the plurality of sampling points to determine whether multiple of the sampling points would give the same processing result when processed by the processing stage;
    when it is determined that multiple of the sampling points would give the same processing result, processing a first one of those sampling points and disabling one or more respective processing pipeline (s) for the other(s) of the multiple sampling points determined to give the same processing result;

generating location information indicative of the respective location of the other(s) of the multiple sampling points determined to give the same processing result to allow the other(s) of the multiple sampling points to subsequently be written out for their respective locations; and writing out the processing result for the multiple sampling points by duplicating the result of the processing of the first sampling point and writing out the duplicated result for the respective location(s) for the other(s) of the multiple sampling points determined to give the same processing result based on the associated location information.

20. A graphics processing pipeline for processing graphics fragments, wherein the graphics fragments each represent a set of sampling points to be processed, and wherein the graphics processing pipeline comprises a plurality of processing stages, wherein at least one processing stage of the graphics processing system comprises:

an input circuit for providing a plurality of sampling points to be processed in parallel by a plurality of processing pipelines of the processing stage;

a comparator circuit for comparing the plurality of sampling points to determine whether multiple of the sampling points would give the same processing result when processed by the processing stage;

a processing circuit comprising a plurality of processing pipelines for processing a plurality of sampling points;

a control circuit for controlling which of sampling points are processed by the processing circuit, wherein the control circuit is configured to, when it is determined that multiple of the sampling points would give the same processing result, cause a first one of those sampling points to be processed by the processing stage and disable one or more respective processing pipeline (s) for the other(s) of the multiple sampling points determined to give the same processing result, wherein the control circuit is further configured to generate location information indicative of the respective location of the other(s) of the multiple sampling points determined to give the same processing result to allow the other(s) of the multiple sampling points to subsequently be written out for their respective locations; and an output circuit for writing out the processing result for the sampling points, wherein the output circuit is configured to duplicate the result of the processing of the first sampling point and write out the duplicated result for the respective location(s) for each of the other(s) of the multiple sampling points that were determined to give the same processing result based on the associated location information.

21. A non-transitory computer readable storage medium storing software code that when executing on a data processor performs a method of processing graphics fragments within a processing stage of a graphics processing pipeline, wherein the graphics fragments each represent a set of one or more sampling points to be processed, the method comprising:

providing a pool of sampling points to be processed, wherein the number of sampling points within the pool of sampling points is greater than the number of sampling points that can be processed by the processing stage in a single cycle;

comparing sampling points within the pool of sampling of points with each other to determine whether multiple of the sampling points would give the same processing result when processed by the processing stage;

when it is determined that multiple of the sampling points would give the same processing result, processing a first one of those sampling points and generating location information for the other(s) of the multiple sampling points that were determined to give the same processing result, wherein the location information contains information indicative of the respective location of the other(s) of the multiple sampling points to allow the other(s) of the multiple sampling points to subsequently be written out for their respective locations; and writing out the processing result for each of the multiple sampling points by duplicating the result of the processing of the first sampling point and writing out the duplicated result for the respective location(s) for each of the other(s) of the multiple sampling points that were determined to give the same processing result based on the associated location information.

* * * * *